J. S. COOPER.
BEET HARVESTER.
APPLICATION FILED OCT. 9, 1916.

1,257,953.

Patented Feb. 26, 1918.
4 SHEETS—SHEET 1.

WITNESSES:

INVENTOR
Joel S. Cooper
BY Strong & Townsend
ATTORNEYS

J. S. COOPER.
BEET HARVESTER.
APPLICATION FILED OCT. 9, 1916.

1,257,953.

Patented Feb. 26, 1918.
4 SHEETS—SHEET 4.

WITNESSES:
Lincoln Johnson
Thos Castberg

Joel S. Cooper
BY Strong & Townsend
ATTORNEYS

UNITED STATES PATENT OFFICE.

JOEL S. COOPER, OF SANTA BARBARA, CALIFORNIA.

BEET-HARVESTER.

1,257,953.  Specification of Letters Patent.  Patented Feb. 26, 1918.

Application filed October 9, 1916. Serial No. 124,611.

*To all whom it may concern:*

Be it known that I, JOEL S. COOPER, a citizen of the United States, residing at the city and county of Santa Barbara and State of California, have invented new and useful Improvements in Beet-Harvesters, of which the following is a specification.

This invention relates to a beet harvester and has for its object to provide a unitary structure capable of digging the beets, cleaning and topping them, and delivering the topped beets to a receptacle.

In carrying out this object, I employ a wheel frame provided with a plow on its forward end, said plow being especially designed to remove the beets from the earth, an endless conveyer in the wake of the plow to receive the beets and deliver them free of dirt upwardly and rearwardly on the frame, means on the frame for removing the tops from the beets, and a delivery conveyer arranged at the rear of the frame to receive the topped beets and deliver them to one side of the frame.

One form which my invention may assume is exemplified in the following description and illustrated in the accompanying drawings; in which:—

Figure 1:
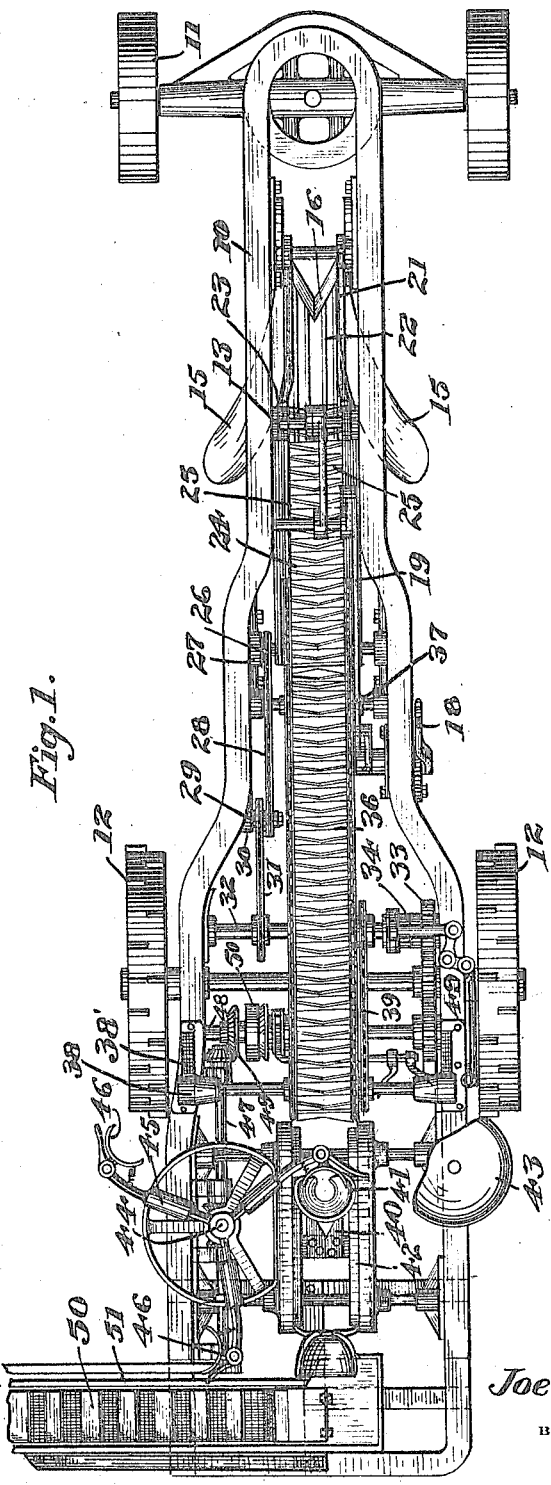
Figure 1 shows a plan view of a device embodying my invention.
Figure 2:
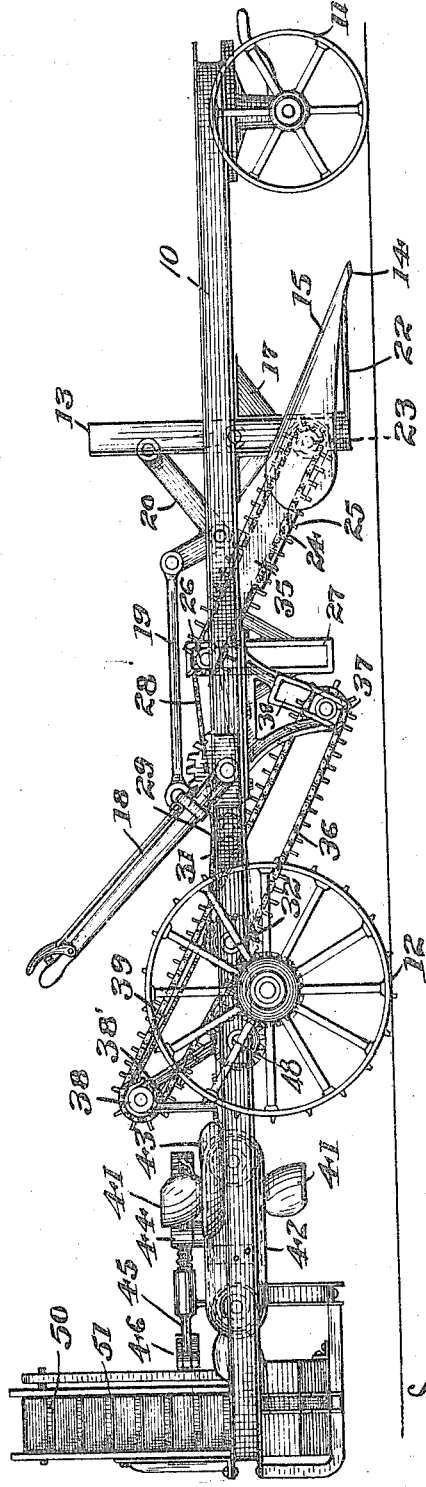
Fig. 2 shows a side elevation of the same.
Figure 3:
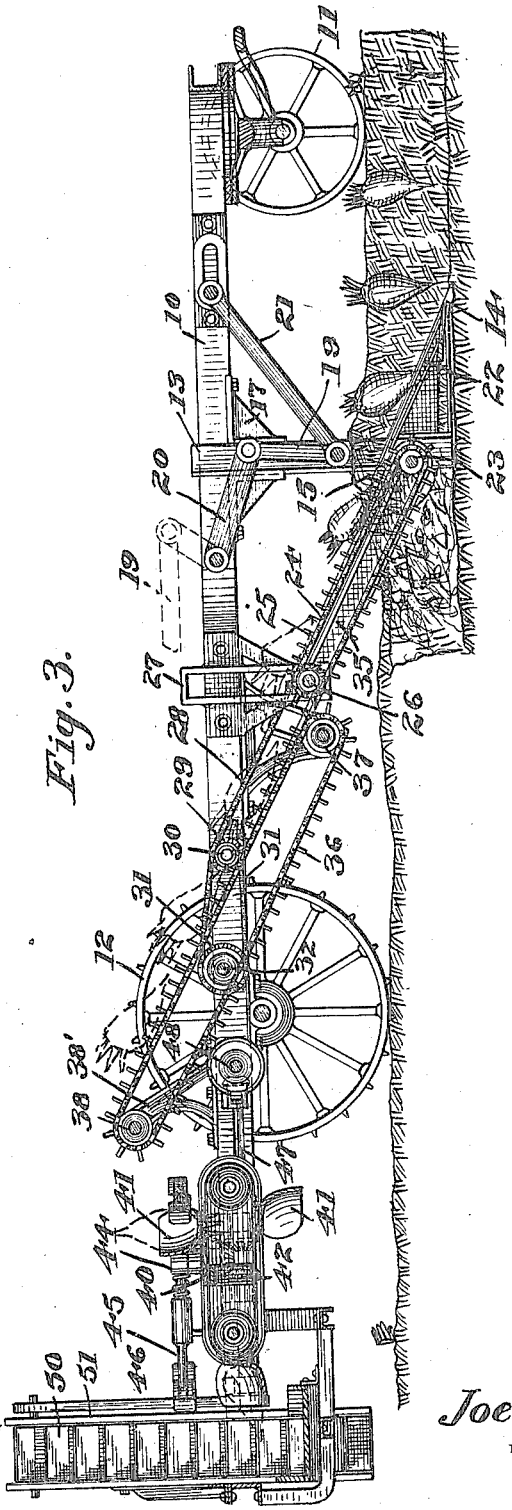
Fig. 3 shows a central vertical longitudinal sectional view of the beet harvester.
Figure 4:
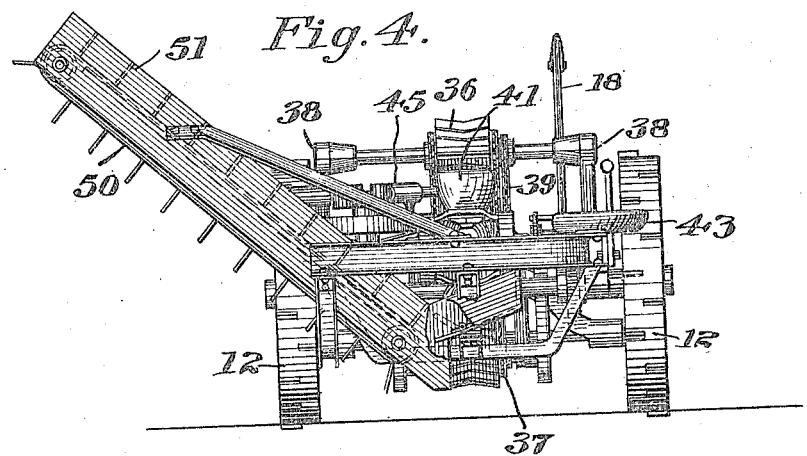
Fig. 4 shows a rear elevation of same.
Figure 5:
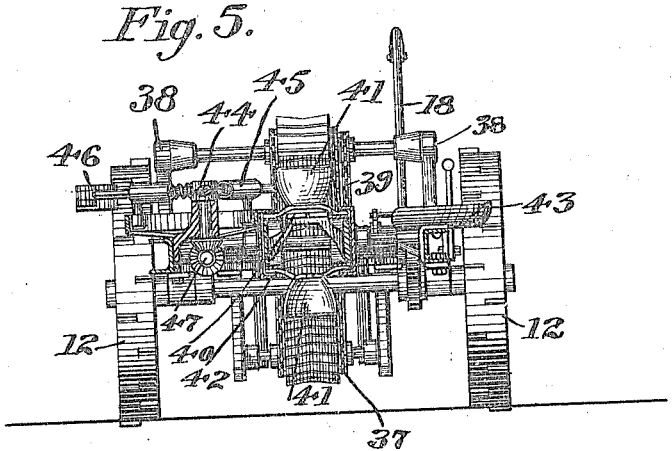
Fig. 5 shows a similar view with the delivery conveyer at the rear removed.

Referring in detail to the accompanying drawings, the beet harvester there shown comprises an elongated frame 10 provided with front carrying wheels 11 and rear carrying and traction wheels 12. Near the forward end of the frame is an adjustable standard 13 carrying at its lower end a plow bottom 14, the latter as shown in Fig. 1 comprising double mold boards 15 with V shaped notch 16 at the point of the plow. The standard 13 is fitted slidably in a socket 17 and is adjusted vertically by means of a lever 18 connected by links 19 and a bell crank 20 with said standard, a tension bar 21 being connected pivotally to the standard and slidably to the forward end of the frame for the purpose of lending support to the plow.

Between the opposite mold boards 15 of the plow and forming the intermediate portion thereof, are upwardly and rearwardly extending spaced rods 22 upon which the beets are adapted to ride, the spaced rods permitting the loose earth to fall below. Beneath the rear end of said rods and journaled to the lower end of the standard 13 is a pair of sprocket wheels 23 over which run spaced sprocket chains 24 connected together by transverse bars 25. The rear sprocket wheels 26 for said chains 24 are carried on bearings slidably mounted in vertical guideways 27 secured to the frame, and are driven by means of a chain 28 connected to a sprocket wheel 29 upon a support 30. The wheel 29 is driven by means of a sprocket wheel and chain 31 connected to a transverse shaft 32 journaled upon the frame adjacent the axle of the rear carry wheels 12, and operated by spur gear mechanism 33 therefrom, a suitable clutch mechanism 34 being interposed to control the operation of the driven parts. The bearings for the sprocket wheels 26 at the rear of the sprocket chain conveyer 24 are formed upon the ends of longitudinal bars 35 rigid with the plow bottom so that when the latter is raised or lowered by means of the lever 18, the conveyer 24 is moved bodily therewith.

To receive the beets from the conveyer 24 is a second conveyer 36 mounted at the rear thereof and extending upwardly on the frame. The sprocket wheels 37 at the forward end of the conveyer 36 have their bearings mounted in curved guide members 38' fixed to the frame, so that suitable adjustment may be made between the front end of the conveyer 36 and the rear end of the conveyer 24. The rear sprocket wheels 38 of the conveyer 36 are driven by means of a chain 39 from the counter shaft 32, said conveyer being controlled in its operation by the clutch mechanism 34.

At the rear of and in a line with the conveyer 36, I arrange means for topping the beets, said means comprising a blade 40 having a V shaped notch at its forward end and mounted stationarily on the frame. Across this blade a plurality of holders 41 carried at intervals on endless belts 42 are adapted to be passed, said holders being each cup-shaped and adapted to receive the beet therein in inverted position so that the top of the beet projects below in the path of the blade 40. A seat 43 is arranged adjacent the topper, and an attendant places the beets in position within the holders. For moving the endless belts and holders I employ a vertical shaft 44 provided with radial arms 45, each arm fitted at its outer end with a curved plate 46 pivotally mounted thereon. The shaft 44 is driven by means of a horizontal shaft 47 geared to the vertical shaft 44 and operated by a counter shaft 48, the latter driven by means of spur gearing 49 connected with the axle of the rear carrying wheels. Suitable clutch mechanism 50 is interposed between the countershaft 48 and transmission shaft 47 for controlling the operation of the radial arms. With the arms in rotation the curved plate 46 thereon engages the beet and holder 41 and moves the same rearwardly across the blade 40.

At the rear of the endless belts 42 is a delivery conveyer 51 carried on the frame and extending transversely thereof to one side of the machine. The inward end of the conveyer 50 is in position to receive the beets from the holders 41 and carry the same to one side where they are dumped into a receptacle such as a wagon.

Having thus described my invention, what I claim and desire to secure by Letters Patent is:—

1. In a beet harvester, a stationary blade, a plurality of holders to receive the beets in position to dispose the tops in line with the blade, and means for moving the holders across the blade whereby to sever the tops, said means comprising radial arms to engage the beets in the holders and move the same across the blade.

2. In a beet harvester, a stationary blade, a plurality of holders to receive the beets to dispose the tops in a line with the blade, endless belts for carrying said holders, and means engaging the beets for actuating said belts to move the holders across the blade whereby to sever the tops.

3. In a beet harvester, a fixed cutting blade, a pair of horizontally moving endless belts on opposite sides of the blade, cup-shaped beet holders connected to said belts and arranged to move over the blade and formed to receive the beets in inverted position so that the beet tops extend below the holders, a vertical shaft, a series of radial arms borne by the shaft, means to drive the arms, and spring pressed pivoted members borne by the arms and arranged to engage the beets to move the latter against the holders and with the latter to carry the beets over the cutting blade.

4. In a beet harvester, a cutter, a series of beet holders movable over the cutter, a series of members for moving said holders over the cutter, and means for progressively moving said members against the beets to thereby progressively move the holders relative to the cutter.

5. In a beet harvester, cutting means, beet holders movable relative to the cutting means, and means to engage the beets to hold same in the holders and for simultaneously moving the holders past the cutting means.

6. In a beet harvester, cutting means, an endless carrier, beet holders carried by the carrier, and a rotatable device having beet engaging means thereon which latter operate over the carrier and hold the beets in the holders of the carrier and at the same time actuate the carrier.

7. In a beet harvester, cutting means, movable beet holders arranged to carry the beet tops into engagement with said cutting means, and means to successively move the beet holders relative to said cutting means, by engaging the beets and moving same against the holders.

8. In a beet harvester, cutting means, endless beet holders movable to carry the beet tops into engagement with said cutting means, and beet engaging means for moving the beets and successively therewith the holders past said cutting means.

9. In a beet harvester, cutting means, beet holders horizontally movable past said cutting means, and horizontally movable means to engage the beets and successively move the holders.

10. In a beet harvester, cutting means, beet holders horizontally movable past said cutting means, and horizontally movable means to successively move the holders by engaging the beets and moving same against the holders.

11. In a beet harvester, cutting means, a series of beet holders successively movable relative to said cutting means, and means for moving the holders by impact against the beets therein.

12. In a beet harvester, cutting means, endless beet holders movable relative to said means to effect topping of the beets, and rotating means having elements for engaging the beets to thereby successively move the beets and therewith the holders.

13. In a beet harvester, cutting means, beet holding means movable relative thereto, and means having pivoted tensioned beet engaging means to engage the beets and thereby move the holding means to effect topping of the beets.

14. In a beet harvester, cutting means, normally quiescent means to receive and hold the beets, and means engageable with the beets to move said means and therewith the beets relative to the cutting means to effect topping of the beets.

15. In a beet harvester, a cutter, a series of holders movable past the cutter, and a rotatable device for holding the beets in the holders and for simultaneously moving the holders past the cutting means.

In testimony whereof I have hereunto set my hand in the presence of two subscribing witnesses.

JOEL S. COOPER.

Witnesses:
JOHN H. HERRING,
GENEVIEVE S. DONELIN.